US010586294B1

(12) United States Patent
Wilson et al.

(10) Patent No.: US 10,586,294 B1
(45) Date of Patent: Mar. 10, 2020

(54) MOBILE FOOD ORDER IN ADVANCE SYSTEMS

(71) Applicant: Allstate Insurance Company, Northbrook, IL (US)

(72) Inventors: Thomas J. Wilson, Chicago, IL (US); Edward A. Biemer, Eastbourne (GB)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/191,265

(22) Filed: Nov. 14, 2018

Related U.S. Application Data

(63) Continuation of application No. 14/444,524, filed on Jul. 28, 2014, now Pat. No. 10,169,837, which is a continuation-in-part of application No. 14/216,095, filed on Mar. 17, 2014.

(51) Int. Cl.
*G06Q 30/06* (2012.01)
*G06Q 50/12* (2012.01)

(52) U.S. Cl.
CPC ......... *G06Q 50/12* (2013.01); *G06Q 30/0633* (2013.01)

(58) Field of Classification Search
None
See application file for complete search history.

(56) References Cited

U.S. PATENT DOCUMENTS 6,711,474 B1 * 3/2004 Treyz .................. G01C 21/26
701/1
8,249,810 B2 * 8/2012 Jones ................ G01C 21/3446
701/400

(Continued)

FOREIGN PATENT DOCUMENTS

WO 2000040038 A2 7/2000
WO 2011079324 A2 6/2011

OTHER PUBLICATIONS

Oct. 1, 2015—U.S. Non-Final Office Action—U.S. Appl. No. 14/216,095.

(Continued)

*Primary Examiner* — Fateh M Obaid
(74) *Attorney, Agent, or Firm* — Banner & Witcoff, Ltd.

(57) ABSTRACT

Aspects of the disclosure provide a computer-implemented method and system for ordering food remotely or from a vehicle for pick-up or delivery by providing the use of an application on a mobile device that provides information that allows the ordering. The computer-implemented method and system may include an order in advance application that allows a user or the system automatically to place an order based on previous orders. The computer-implemented method and system may also allow for the electronic payment for the food. Telematics information regarding the user and/or the vehicle may be utilized to provide information regarding a user's location, velocity, route, and destination. The computer-implemented method and system may utilize this telematics information to provide a prioritized ranked list of restaurants for the user. The computer-implemented method and system may utilize insurance information to provide additional features and enhance the mobile food order method and system.

18 Claims, 6 Drawing Sheets

(56) References Cited

U.S. PATENT DOCUMENTS

| | | | | |
|---|---|---|---|---|
| 8,442,758 B1* | 5/2013 | Rovik | ................ | G06Q 10/109 701/424 |
| 2002/0049535 A1* | 4/2002 | Rigo | ................ | G01C 21/3629 701/431 |
| 2002/0055878 A1* | 5/2002 | Burton | ................ | G06Q 30/06 705/27.2 |
| 2004/0090346 A1* | 5/2004 | Simonds | ............ | B60R 16/0315 340/905 |
| 2008/0248815 A1* | 10/2008 | Busch | ................ | H04W 4/029 455/456.5 |
| 2009/0089183 A1* | 4/2009 | Afram | ................ | G06Q 30/02 705/26.1 |
| 2009/0167553 A1* | 7/2009 | Hong | ................ | G06O 10/02 340/4.61 |
| 2010/0114734 A1* | 5/2010 | Giuli | ................ | G06Q 20/12 705/26.1 |
| 2010/0117806 A1* | 5/2010 | Hong | ................ | G06Q 30/06 340/10.4 |
| 2011/0153457 A1* | 6/2011 | Hinks | ................ | G06Q 20/322 705/26.81 |
| 2011/0213628 A1* | 9/2011 | Peak | ................ | G06Q 40/08 705/4 |
| 2011/0258058 A1* | 10/2011 | Carroll | ................ | G06Q 30/06 705/15 |
| 2011/0270662 A1* | 11/2011 | Rocco | ................ | G06Q 30/02 705/14.27 |
| 2011/0307188 A1* | 12/2011 | Peng | ................ | G06Q 10/0639 702/33 |
| 2012/0059729 A1* | 3/2012 | Roa | ................ | G06Q 30/02 705/26.1 |
| 2012/0290383 A1* | 11/2012 | Busch | ................ | G06Q 30/02 705/14.36 |
| 2014/0089061 A1* | 3/2014 | Vitale | ................ | G06Q 20/3274 705/7.41 |
| 2014/0129130 A1* | 5/2014 | Kuramura | ............ | G01C 21/00 701/400 |

OTHER PUBLICATIONS

Oct. 7, 2016—U.S. Non-Final Office Action—U.S. Appl. No. 14/216,095.
Dec. 1, 2016—U.S. Non-Final Office Action—U.S. Appl. No. 14/444,524.
May 19, 2016—U.S. Final Office Action—U.S. Appl. No. 14/216,095.
May 5, 2017—U.S. Final Office Action—U.S. Appl. No. 14/216,095.
Jun. 19, 2017—U.S. Final Office Action—U.S. Appl. No. 14/444,524.
Oct. 24, 2017—U.S. Non-Final Office Action—U.S. Appl. No. 14/444,524.
Jan. 12, 2018—U.S. Non-Final Office Action—U.S. Appl. No. 14/216,095.
May 17, 2018 U.S. Final Office Action—U.S. Appl. No. 14/444,524.
Sep. 4, 2018—U.S. Final Office Action—U.S. Appl. No. 14/216,095.
Sep. 13, 2018—U.S. Notice of Allowance—U.S. Appl. No. 14/444,524.
Jul. 10, 2019—U.S. Final Office Action—U.S. Appl. No. 14/216,095.
Feb. 8, 2019—U.S. Non-Final Office Action—U.S. Appl. No. 14/216,095.

* cited by examiner

MOBILE FOOD ORDER IN ADVANCE SYSTEMS

CROSS REFERENCE TO RELATED APPLICATIONS

This Application is a continuation of U.S. application Ser. No. 14/444,524, filed Jul. 28, 2014, which is a continuation-in-part of U.S. application Ser. No. 14/216,095, filed Mar. 17, 2014, the entire disclosure of which is herein incorporated by reference.

FIELD OF THE INVENTION

The disclosure relates generally to methods and systems for mobile food ordering. More specifically, the disclosure provides computer-implemented methods and systems for ordering food remotely or from a vehicle for pick-up or delivery. The methods and systems may include an order in advance application that allows a user or the system automatically to place an order based on previous orders. The methods and systems may also include the use of an application on a mobile device that provides telematics information and restaurant information to locate restaurants; prioritizes the restaurants based on the user preferences, telematics information, and restaurant information; and facilitates the ordering of the food and the electronic payment for the food. Additionally, insurance information may be integrated to assist and enhance the mobile food ordering methods and systems.

BACKGROUND

Most restaurants individually have mobile food ordering options available to a user via the internet or a mobile phone application. Additionally, telematics devices are known and used in the art to provide various telematics information to users regarding their location, direction of travel, velocity, route, and/or destination. Additionally, there is a vast wealth of insurance information that includes locations and instances for previous accidents and previous insurance claims.

Accordingly, it would be desirable to provide mobile food ordering systems and methods for safe and fast mobile food ordering using a hands-free system from a determined list of prioritized restaurants that incorporates restaurant information, telematics information, and insurance information. It would be desirable to include telematics information and restaurant information to locate restaurants; prioritize the restaurants based on the user preferences, telematics information, and restaurant information; and facilitate the ordering of the food and the electronic payment for the food. Additionally, it would be desirable to integrate the vast wealth of insurance information regarding accidents and claims to further enhance the mobile food ordering methods and systems by providing safe routes and healthy recommendations to the user.

BRIEF SUMMARY

The following presents a simplified summary of the invention in order to provide a basic understanding of some aspects of the disclosure. This summary is not an extensive overview of the invention. It is not intended to identify key or critical elements of the invention or to delineate the scope of the invention. The following summary merely presents some concepts of the invention in a simplified form as a prelude to the more detailed description provided below.

A first aspect of the disclosure provides a computer-implemented method for a mobile food order system. The method may comprise: (1) receiving, through a mobile application executing on a mobile device having at least one processor, a mobile food order request from a user, wherein the mobile order request is received through the mobile device via a hands-free system; (2) receiving, through the mobile application, an order in advance request from the user; (3) receiving, by the mobile application, telematics information from a telematics device; (4) providing, by the mobile application, a prioritized ranking of restaurants based on the telematics information, the mobile food order request, and the order in advance request; (5) providing, by the mobile application, restaurant information and menu information based on the prioritized ranking of restaurants; (6) receiving, by the mobile application, a mobile food order from the user; (7) transmitting, by the mobile application, the mobile food order to a selected restaurant; and (8) providing, by the mobile application, an electronic payment for the mobile food order. The order in advance request may include restaurant information that includes one or more previous orders from the user at the selected restaurant. Additionally, the order in advance request may include menu information based on one or more of the previous orders from the user at any of the restaurants on the prioritized restaurant ranking list.

Another aspect of the disclosure provides a computer-implemented method for a mobile food order system. The method may comprise: (1) receiving, by a mobile food order system with a mobile application executing on a mobile device having at least one processor, a mobile food order request from a user; (2) receiving, by the mobile food order system, an order in advance request from the user; (3) receiving, by the mobile food order system, telematics information from a telematics device; (4) providing, by the mobile food order system, a prioritized ranking of restaurants based on the telematics information, the mobile food order request, and the order in advance request wherein the ranking is based on a safest route to the restaurant as determined by the mobile food order system; (5) providing, by the mobile food order system, restaurant information and menu information based on the prioritized ranking of restaurants and the order in advance request; (6) receiving, by the mobile food order system, a mobile food order from the user; (7) transmitting, by the mobile food order system, the mobile food order to a selected restaurant; and (8) providing, by the mobile food order system, an electronic payment for the mobile food order. Furthermore, the method may comprise providing, by the mobile food order system, menu information based on one or more of the previous orders from the user at any of the restaurants on the prioritized restaurant ranking list.

In another aspect of the disclosure, one or more non-transitory computer readable media storing computer readable instructions that, when executed, may cause an apparatus to: receive, through a mobile application executing on the apparatus, a mobile food order request from a user, wherein the mobile order request is received through the apparatus via a hands-free system; receive, by the mobile application, an order in advance request from the user, wherein the order in advance request is received through the apparatus via a hands-free system; receive, by the mobile application, telematics information from a telematics device; determine and provide, by the mobile application, a prioritized ranking of restaurants based on the telematics information, the order in advance request, and the mobile food order request, wherein the ranking is based on a safest route to the restaurant; provide, by the mobile application, restaurant information and menu information based on the prioritized ranking of restaurants; receive, by the mobile application, a mobile food order from the user; transmit, by the mobile application, the mobile food order to a selected restaurant; provide, by the mobile application, an electronic payment to the selected restaurant for the mobile food order; and provide, by the mobile application, a reward to the user based on the mobile food order and the selected restaurant.

The details of these and other embodiments of the present disclosure are set forth in the accompanying drawings and the description below. Other features and advantages of the disclosure will be apparent form the description and drawings.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the subject matter of the disclosure may be practiced. It is to be understood that other embodiments may be utilized and structural and functional modifications may be made without departing from the scope of the present disclosure.

Aspects of the disclosure provide a computer-implemented method and system for ordering food remotely or from a vehicle for pick-up or delivery. The methods and systems may include the use of an application on a mobile device that provides telematics information and restaurant information to locate restaurants; prioritizes the restaurants based on the user preferences, telematics information, and restaurant information; and facilitates the ordering of the food and the electronic payment for the food. Telematics information regarding the user and/or the vehicle may be utilized to provide information regarding a user's location, velocity (instantaneous and average), route, and destination. The computer-implemented method and system may utilize this telematics information to provide a prioritized ranked list of restaurants for the user. The computer-implemented method and system may utilize insurance information to provide additional features and to enhance the mobile food ordering methods and systems by providing safe routes and healthy recommendations to the user as described and detailed below.

Figure 1:
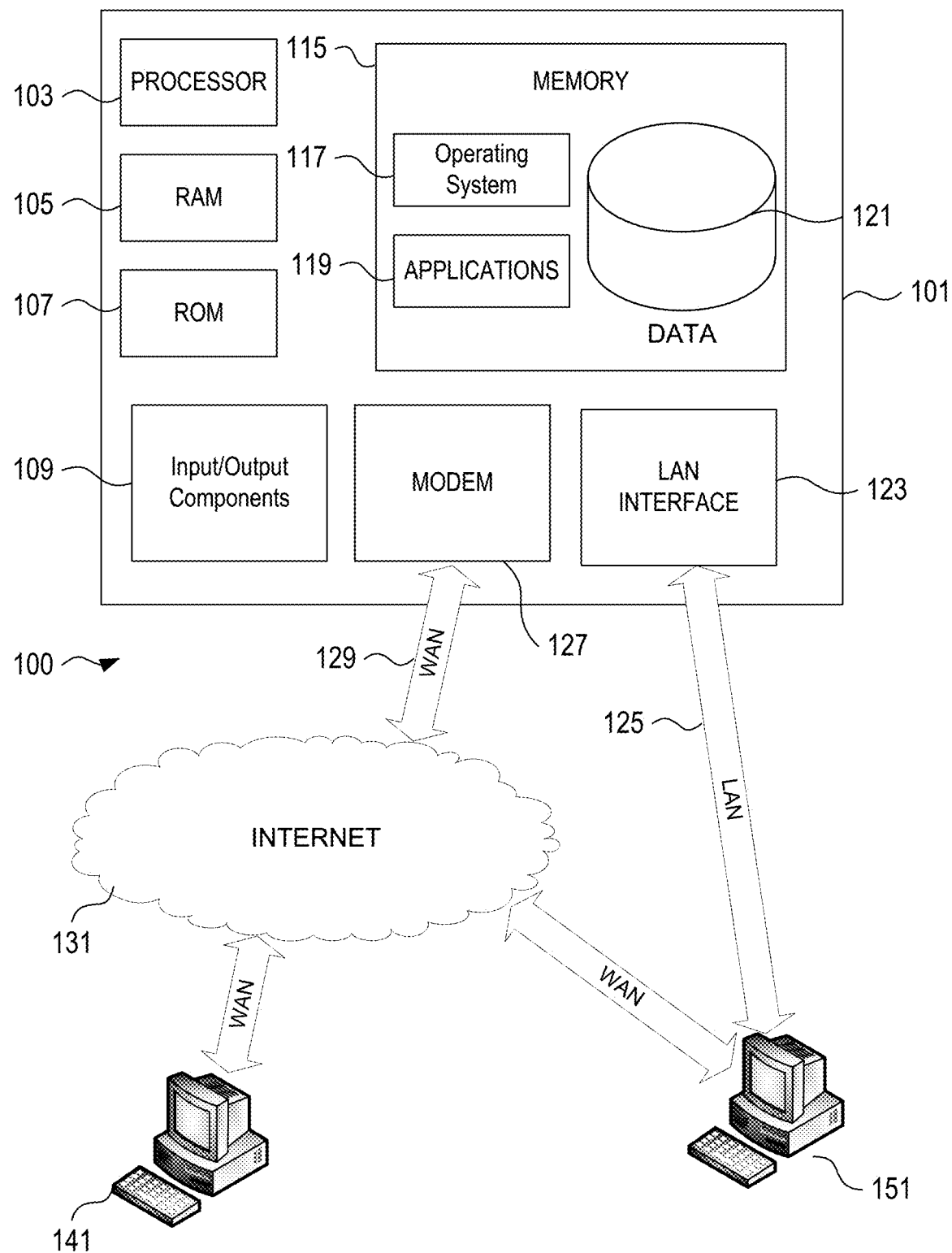
FIG. 1 is an illustrative network environment and computing systems that may be used to implement aspects of the present disclosure.

FIG. 1 illustrates a block diagram of a mobile food order server 101 (e.g., a computer server) in communication with a mobile food order system 100 that may be used according to an illustrative embodiment of the disclosure. The mobile food order server 101 may have a processor 103 for controlling overall operation of the a mobile food order server 101 and its associated components, including RAM 105, ROM 107, input/output component 109, and memory 115.

Input/Output (I/O) 109 may include a microphone, keypad, touch screen, and/or stylus through which a user of the mobile food order server 101 may provide input, and may also include one or more of a speaker for providing audio output and a video display device for providing textual, audiovisual and/or graphical output. Additionally, a hands-free or voice aspect may be utilized to provide input for the mobile food order server 101. Software may be stored within memory 115 and/or storage to provide instructions to processor 103 for enabling the mobile food order server 101 to perform various functions. For example, the memory 115 may store software used by the mobile food order server 101, such as an operating system 117, application programs 119, and an associated database 121. The processor 103 and its associated components may allow the mobile food order server 101 to run a series of computer-readable instructions to receive mobile food order requests from a user, receive telematics information, and analyze this information to provide a prioritized ranking of restaurants to fulfill the mobile food order request. Additionally, the processor 103 and its associated components may allow the mobile food order server 101 to provide restaurant information, menu information and transmit a mobile food order to a restaurant or restaurant server. Additionally, the processor 103 and its associated components may allow the mobile food order server 101 to run a series of computer-readable instructions to provide an electronic payment for the food ordered, receive confirmation of the order, and provide rewards to the user. In addition, the processor 103 may receive insurance information in order to enhance and improve the food ordering process. Further still, the processor 103 may derive insurance rating factors for insurance coverage and premiums based on the restaurants, specific food ordered, and the frequency of the food orders.

The mobile food order server 101 may operate in a networked environment supporting connections to one or more remote computers, such as terminals 141 and 151. The terminals 141 and 151 may be personal computers or servers that include many or all of the elements described above relative to the mobile food order server 101. Alternatively, terminal 141 and/or 151 may be data stores for storing information related to restaurant information or insurance information. The network connections depicted in FIG. 1 include a local area network (LAN) 125 and a wide area network (WAN) 129 but may also include other networks. When used in a LAN networking environment, the mobile food order server 101 is connected to the LAN 125 through a network interface or adapter 123. When used in a WAN networking environment, the mobile food order server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the mobile food order server 101 according to an illustrative embodiment of the disclosure may include computer executable instructions for invoking functionality related to mobile food order and insurance systems. The application program 119 may be detailed further as the mobile food order application 300. The mobile food order server 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, mobile devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program applications or modules, being executed by a computer. Generally, program applications or modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, the program applications or modules may be located in both local and remote computer storage media including memory storage devices.

Figure 2:
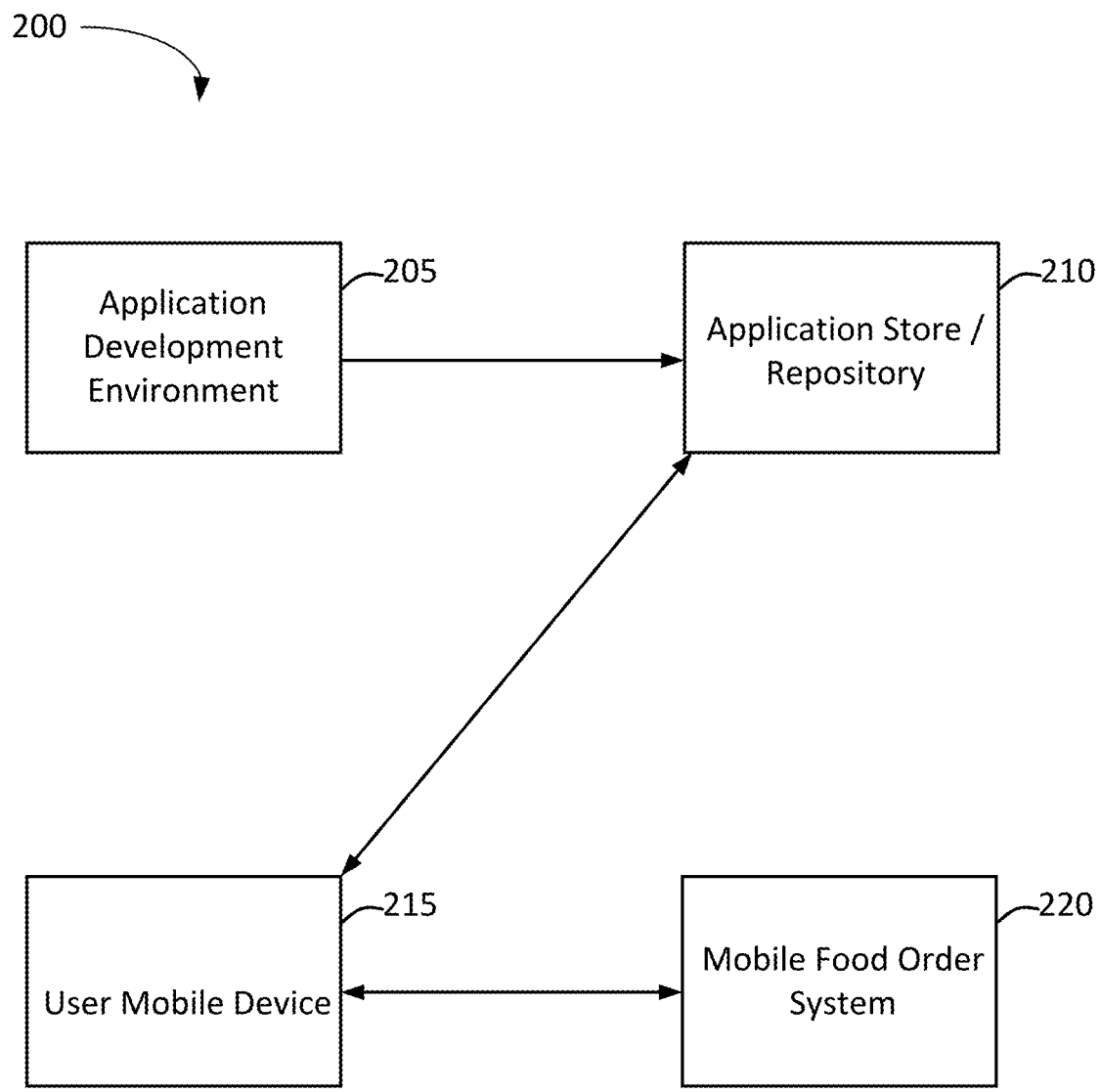
FIG. 2 is an illustrative example operating environment that may be used to implement the processes and functions of certain aspects of the present disclosure.

FIG. 2 illustrates an example system including various components for facilitating a mobile food order application and mobile food order process. The application system 200 may include an application development environment 205, an application store or repository 210, a user mobile device 215, and a mobile food order system 220. The application development environment 205 may be operated by an insurance provider such as an insurance company. Application development environment 205 may include a hardware environment or a software environment. For example, the application development environment 205 may be provided on a server. Alternatively or additionally, the application development environment 205 may be provided as a software environment in which applications may be constructed and tested. The application development environment 205 may further be used to validate the integrity of applications before deployment through one or more distribution channels such as application store/repository 210. Validating the integrity of an application may include executing the application against multiple data sets to insure correct operation, verifying security and privacy protections, verifying that the application adheres to one or more requirements or regulations (e.g., industry requirements, government regulations, privacy guidelines/requirements) and the like and/or combinations thereof.

Once the application has been published to the application store/repository 210, the application may be made available to a general public, subscribers to the application store/repository 210, or users of a particular operating system, service or other environment. Example application stores or repositories may include the APPLE App Store, the Android Market and the Blackberry App World. The application may be downloaded to one or more devices through the application store/repository 210. In some arrangements, downloading of the applications may be restricted to particular operating systems, hardware devices, device capabilities, software requirements and the like and/or combinations thereof.

User mobile device 215 may be configured to execute applications provided through the application store/repository 210. For example, user mobile device 215 may execute a mobile food order application 300 to help a user order food safely and quickly from their vehicle. User mobile device 215 and the application executing thereon may communicate with a mobile food order system 220.

Application development environment 205, application store or repository 210 and mobile food order system 220 may correspond to a single device, system, server, or location. In other arrangements, the application development environment 205, application store or repository 210 and mobile food order system 220 may be provided as a distributed system among multiple locations and/or devices. The user mobile device 215 may be located remotely from one or more of application development environment 205, application store/repository 210 and/or mobile food order system 220. The various devices and systems 205, 210, 215 and 220 of system 200 may communicate with one another using various protocols and through various networks. For example, the user mobile device 215 may transmit and receive data through a cellular network or other types of wireless networks (e.g., Wi-Fi or Bluetooth or other known and used wireless methods known and used in the art). Alternatively or additionally, communications may be facilitated using a hand-free service with the user mobile device 215. Alternatively or additionally, communications may be facilitated using wired connections and protocols.

The present disclosure may utilize an in-vehicle device 225 to collect and provide telematics information as known and used in the art. The in-vehicle device 225 may include a processor with a display or graphical interface that receives and/or collects driving data and/or telematics information and provides additional information based on the driving data. The driving data and/or telematics information may include, but not be limited to: location, instantaneous velocity, average velocity, route, destination, etc. The in-vehicle device 225, which may be configured to receive real-time vehicle data, may provide a driver with visual and/or audible in-vehicle information. The in-vehicle device 225 may process real-time (i.e., near real-time) data and then display the processed information in a meaningful way on a display or graphical user interface (GUI). The in-vehicle device 225 may receive and/or collect critical driving data and store summary information for and/or about the driver.

The in-vehicle device 225 may communicate with a data collection device or on-board diagnostics port of a vehicle to collect the driving data. In another exemplary embodiment, the in-vehicle device 225 may acquire the driving data directly from the device, such as a smart phone, tablet computer, or vehicle navigation system via a built-in accelerometer and/or a Global Positioning System (GPS).

Figure 3:
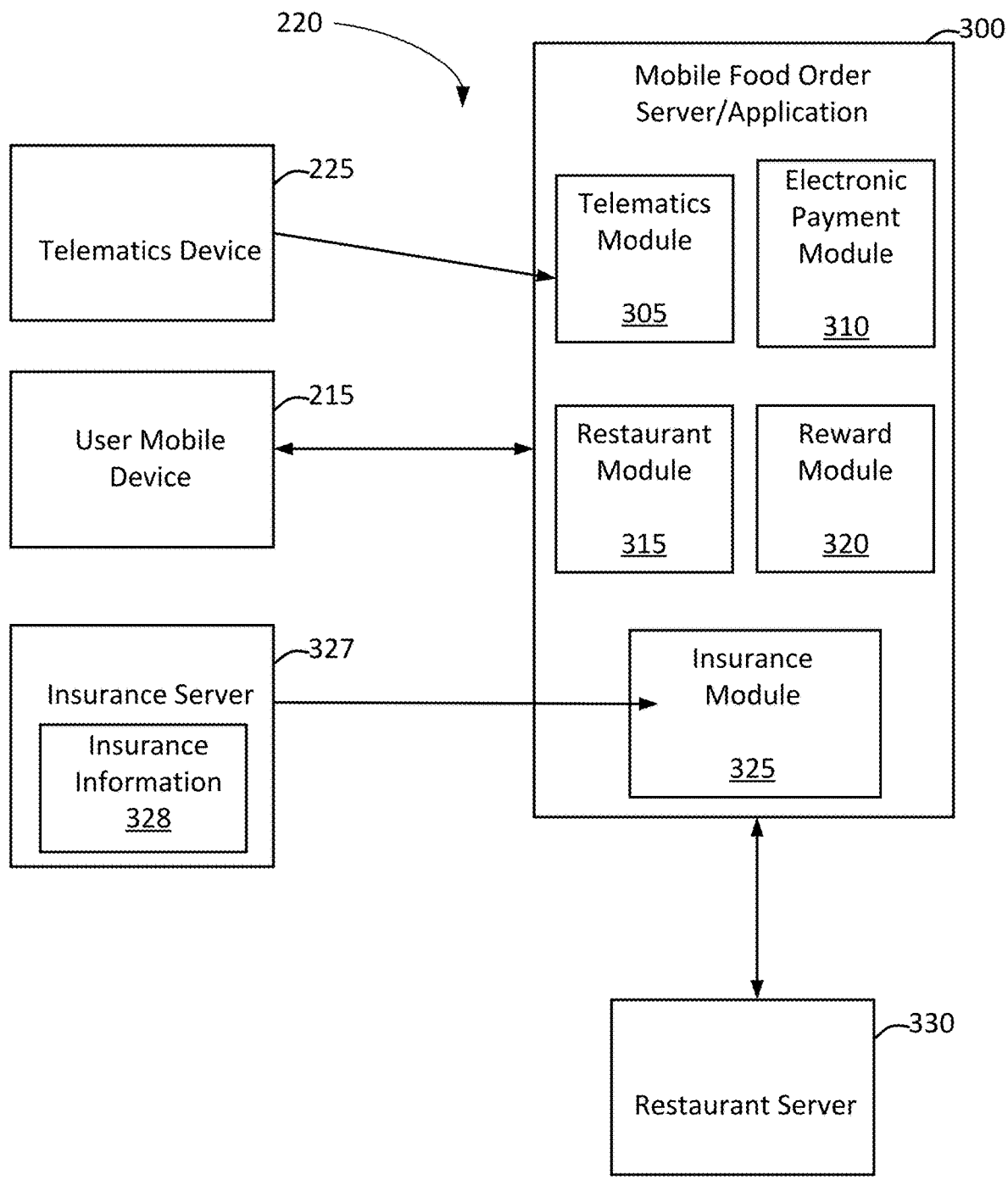
FIG. 3 illustrates an exemplary block diagram of a mobile food order system and application that may be used to implement various aspects of the disclosure.

FIG. 3 is an example block diagram of a mobile food order system 220 and mobile food order application 300. The mobile food order application 300 may include a variety of software or firmware modules such as one or more of the following: a telematics module 305, an electronic payment module 310, a restaurant module 315, a reward module 320, and an insurance module 325. Each of these modules may be utilized by the mobile food order application 300.

The telematics module 305 may be configured to receive, evaluate, and analyze a user's telematics information, such as location, velocity, direction of travel, route, and destination. The telematics module 305 may further be configured to recommend or provide a ranked list of restaurants based on various factors, such as preferred restaurant, safest route, healthiest restaurant, highest rated restaurant, types of restaurants, etc. The telematics module 305 may be in communication with the telematics device or in-vehicle device 225, wherein the telematics device 225 sends the telematics information to the telematics module 305. The telematics module 305 may further calculate and provide information regarding distance to nearest restaurants, time to travel (with or without traffic) to selected restaurants, route information for selected restaurants, etc.

The electronic payment module 310 may be configured to allow for and provide an electronic payment for the food that is ordered. The electronic payment module 310 may be configured to allow for the electronic payment to be automatic with a pre-entered payment method, such as credit card information, bank information, etc. With the automatic electronic payment method, the electronic payment module 310 will automatically send the payment information to the restaurant server 330 after an order has been placed. Additionally, the electronic payment module 310 may be configured to allow for manual individual input of payment methods with each food order. In the manual electronic payment method, an order may not be complete until the user manually inputs payment information to pay for the order.

The restaurant module 315 may be configured to interface with one or more restaurant systems during the food ordering process. The restaurant module 315 may be configured to provide details of a given restaurant, such as location, food type, menu, restaurant ratings, restaurant reviews, etc. Additionally, the restaurant module 315 may be configured to provide real-time information about a given restaurant, such as order wait time, delivery time, seating time, etc. The restaurant module 315 may be in communication with the restaurant server 330, specifically for the real-time restaurant information. Accordingly, a user may be able to receive immediate information about a given restaurant through the restaurant module 315 of the mobile food order application 300.

The reward module 320 may be configured to provide a reward depending on the restaurant selected by the user and potentially the food ordered by the user. If the user chooses a safer restaurant or orders healthy food, the reward module 320 and the mobile food order application 300 may provide a reward, such as cash back, discounts on food, and/or bonus food items.

Additionally, an insurance module 325 may be included with the mobile food order application 300. The insurance module 325 may include insurance information 328 that may reside on an insurance server 327 regarding information about a particular user, previous accidents, previous claims, information about other users with similar characteristics, etc. The insurance module 325 may be configured to utilize ordering information in rating factors for providing insurance to the user. The insurance module 325 may derive rating factors for providing insurance based on various information, such as which restaurants the user orders from, when the food is ordered, and/or what type of food is ordered. Additionally, the insurance module 325 may be configured to utilize the insurance information 328 and specifically the knowledge and information of previous accidents and claims to assist in selecting the route or restaurant for the user. Additionally, the insurance module 325 may be configured to utilize the insurance information 328 known about a particular user and insurance information 328 about users with similar characteristics to provide a prioritized rank and/or recommendations regarding routes and restaurant destinations. The insurance module 325 and the reward module 320 may be configured to provide a reward depending on the restaurant selected by the user and potentially the food ordered by the user. If the user chooses a safer restaurant or orders healthy food, the insurance module 325 and reward module 320 may provide an insurance reward, such as a discount on future premiums, increased coverage, or decreased deductibles.

Figure 4:
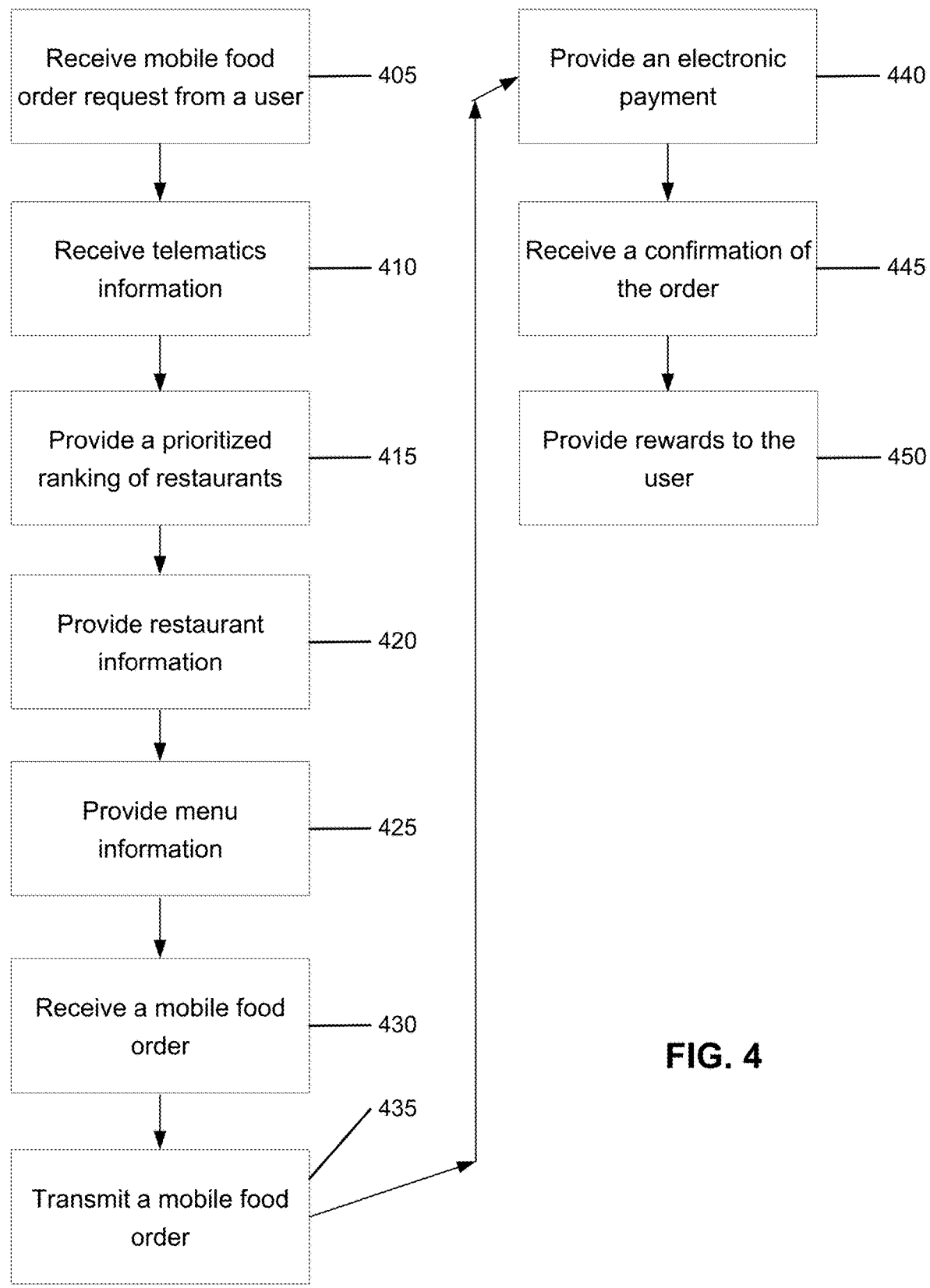
FIG. 4 illustrates a method of providing a mobile food order application system and application in accordance with aspects of the disclosure.

The steps that follow in FIG. 4 may be implemented by one or more of the components in FIGS. 1 through 3 and/or other components, including other computing devices. FIG. 4 illustrates an example process 400 by which a user may utilize a computer-implemented method and system and a mobile food order application 300 to provide safe and quick ordering of food a user's vehicle for pick-up, delivery, driver-thru, or eat-in. The mobile food order application 300 may be located on a user's mobile device 215, such a cell phone, a smart phone, or tablet/laptop computer. The mobile food order application 300 may also be located on a vehicle's on-board computer or navigation system. The mobile food order application 300 may be configured to allow for ordering food remotely or from a vehicle for pick-up or delivery by providing the use of an application on a mobile device 215 that provides information that allows the ordering. The mobile food order application 300 may also allow for the electronic payment for the food. Telematics information regarding the user and/or the vehicle may be utilized to provide information regarding a user's location, velocity (instantaneous and average), route, and destination. The computer-implemented method and system may utilize this telematics information to provide a prioritized ranked list of restaurants for the user.

In step 405, the system may receive a mobile food order request from a user. In this step 405, the user may utilize the mobile food order application 300 on a mobile device 215, such as a cell phone, a smart phone, or a tablet/laptop computer to request a mobile food order. The user may also utilize the mobile food order application 300 on a vehicle's on-board computer or navigation system. In an embodiment according to the disclosure, the system may receive the mobile food order request via a hand-free set up that may be linked or communicatively connected to the mobile device 215 or the vehicle's on-board computer or navigation system. The mobile food order request may include such requests such as the type of restaurant, i.e. fast food or sit-down. The mobile food order request may also include the type of food requested. The mobile food order request may also include whether the order is for drive-thru, pick-up, delivery, fast food or eat-in.

In step 410, the system may receive telematics information. The telematics information may be sent from a telematics device 225 located in the vehicle or as part of the mobile device 215. The telematics information may include information regarding the user and/or the user's vehicle. The telematics information may include information such as the user's location, the user's velocity (both instantaneous and/or average), the user's direction of travel, the user's route and final destination. This telematics information may then be utilized to assist in providing further information to the system and the mobile food order application 300.

In step 415, the system may provide a prioritized ranking of restaurants based on the telematics information and the mobile food order request. For example, if the mobile food order request includes a drive-thru and fast food request, the system will provide a prioritized ranking of drive-thru and fast food restaurants closest to the user and based on the user's direction of travel and or route/destination. Additionally, based on the telematics data and the mobile food order request, the system may know where the user is and the direction of travel of the user and therefore provide the safest route or the safest or healthiest restaurant and/or a prioritized list of those restaurants. Additionally, based on the telematics data and the mobile food order request, the system may provide a list of the highest ranked or highest rated restaurants for the prioritized list of restaurants.

In step 420, the system may provide restaurant information regarding any of the restaurants on the prioritized restaurant ranking list. This restaurant information may include, but not be limited to location, restaurant type, food type, restaurant ratings, restaurant reviews, etc. Additionally, the restaurant information may include real-time information about a given restaurant, such as order wait time, delivery time, seating time, etc. The system may also provide restaurant information based on a specific search request within the mobile food order application. The user may search for a specific restaurant within the mobile food order application with the return of the restaurant information for the searched restaurant or restaurants.

In step 425, the system may also provide menu information regarding any of the restaurants on the prioritized restaurant ranking list. The system may also provide menu information also based on a specific search request within the mobile food order application 300. The user may search for a specific restaurant within the mobile food order application 300 with the return of the menu information for the searched restaurant or restaurants. A user may then place an order from the menu information and restaurant information provided in steps 420 and 425.

In step 430, the system may then receive a mobile food order from the user. The user may input the mobile food order via the menu and/or the restaurant information on the mobile device 215 and the mobile food order application 300 provided in steps 420 and 425. The user may input the mobile food order with a simple one or two-button sequence. The user may also input the mobile food order via the hands-free connection through the mobile device 215 and the mobile food order application 300.

In step 435, the system may transmit the mobile food order to the selected restaurant. The selected restaurant may have a restaurant server 330 or processor that communicates with the mobile food order application 300 and the mobile food order system 220. The selected restaurant may require the necessary hardware and/or software to communicate with the mobile food order application 300 and the mobile food order system 220.

Coincident to step 435, in step 440, the system may also provide an electronic payment for the food to the restaurant server 330. The electronic payment may be made automatically to the restaurant server 330 and facilitated by the user entering their payment information into the mobile food order application 300 during a set-up portion of the application. The electronic payment may also be made to the restaurant server 330 manually for an individual order by entering the payment information when the order is placed.

In step 445, the system may receive a confirmation of the order from the restaurant server 330. The confirmation of the order may be received via one or more of the following methods: email, text, phone call, social media, etc.

In step 450, the system may provide rewards to the user depending on the restaurant chosen by the user and/or the food ordered by the user. The system may also provide rewards based on the user's decision to follow the recommendations of the system. The rewards may include cash back, a reward at the restaurant, a discount at the restaurant, and/or a bonus food item.

According to some arrangements, the process described with respect to FIG. 4 may be provided by a mobile food order application 300 executing on a device such as a user's mobile communication device 215 or a user's vehicle computer or navigation system.

Figure 5:
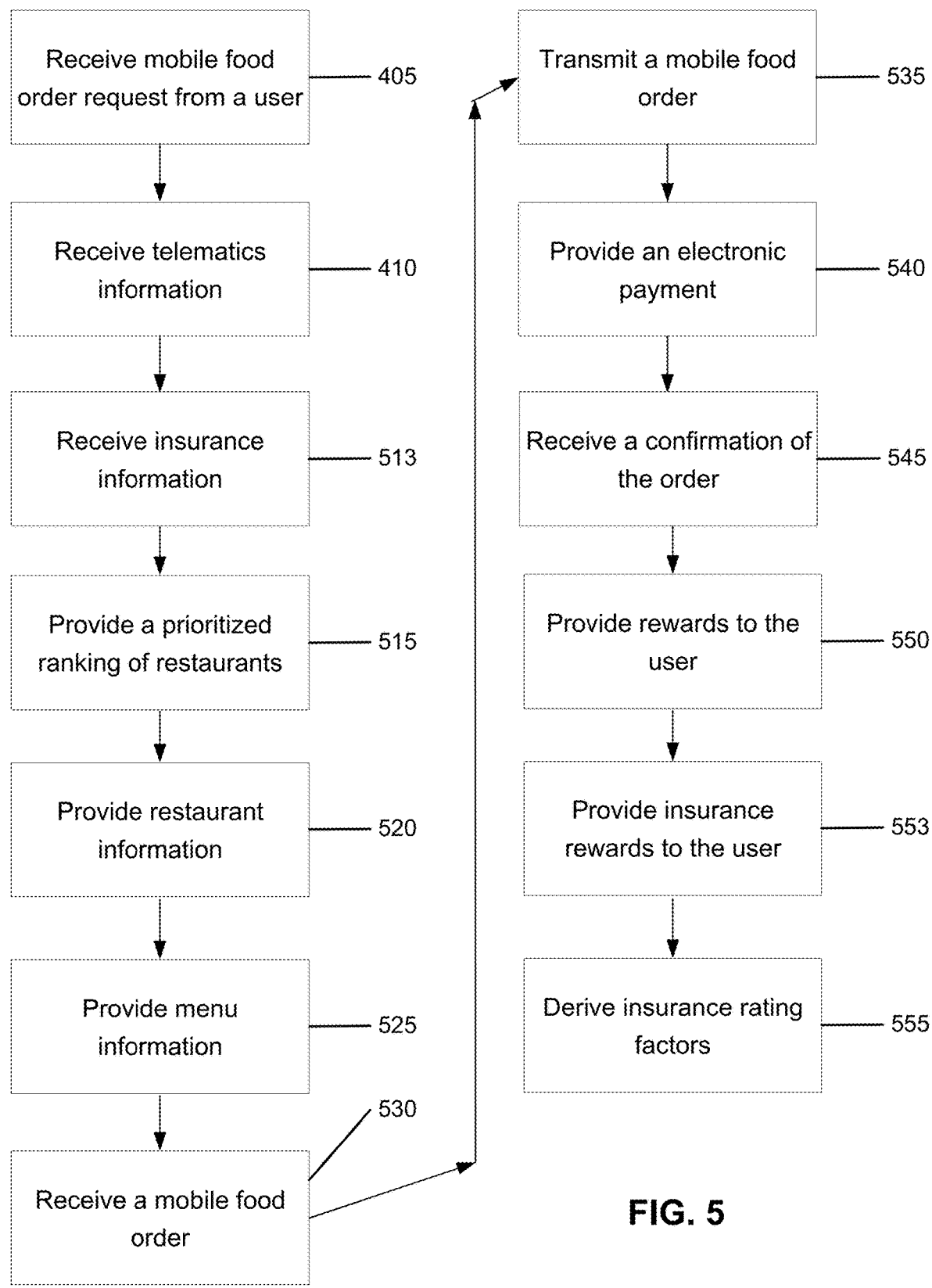
FIG. 5 illustrates another method of providing a mobile food order application system and application that includes insurance aspects in accordance with aspects of the disclosure.

As was described above, the insurance module 309 may be utilized with the computer-implemented method and system and a mobile food order application that incorporates insurance aspects to provide safe and quick ordering of food a user's vehicle for pick-up, delivery, driver-thru, or eat-in. The steps that follow in FIG. 5 may be implemented by one or more of the components in FIGS. 1 through 3 and/or other components, including other computing devices. FIG. 5 illustrates an example process 500 by which a user may utilize a computer-implemented method and system and a mobile food order application 300 with insurance aspects. The mobile food order application may provide safe and quick ordering of food a user's vehicle for pick-up, delivery, driver-thru, or eat-in. The mobile food order application 300 may be located on a user's mobile device 215, such a cell phone, a smart phone, or tablet/laptop computer. The mobile food order application 300 may also be located on a vehicle's on-board computer or navigation system. The mobile food order application may be configured to allow for ordering food remotely or from a vehicle for pick-up or delivery by providing the use of an application on a mobile device 215 that provides information that allows the ordering. The mobile food order application 300 may also allow for the electronic payment for the food. Telematics information regarding the user and/or the vehicle may be utilized to provide information regarding a user's location, velocity (instantaneous and average), route, and destination. The computer-implemented method and system may utilize this telematics information to provide a prioritized ranked list of restaurants for the user.

In step 505, the system may receive a mobile food order request from a user. In this step 505, the user may utilize the mobile food order application 300 on a mobile device 215, such as a cell phone, a smart phone, or a tablet/laptop computer to request a mobile food order. The user may also utilize the mobile food order application 300 on a vehicle's on-board computer or navigation system. In an embodiment according to the disclosure, the system may receive the mobile food order request via a hand-free set up that may be linked or communicatively connected to the mobile device 215 or the vehicle's on-board computer or navigation system. The mobile food order request may include such requests such as the type of restaurant, i.e. fast food or sit-down. The mobile food order request may also include the type of food requested. The mobile food order request may also include whether the order is for drive-thru, pickup, delivery, fast food or eat-in.

In step 510, the system may receive telematics information. The telematics information may be sent from a telematics device 225 located in the vehicle or as part of the mobile device 215. The telematics information may include information regarding the user and/or the user's vehicle. The telematics information may include information such as the user's location, the user's velocity (both instantaneous and/or average), the user's direction of travel, the user's route and final destination. This telematics information may then be utilized to assist in providing further information to the system and the mobile food order application 300.

In addition to step 510, in step 513 the system may also receive insurance information 328. Insurance information 328 may be utilized with the computer-implemented method and system that may reside on an insurance server 327. The insurance information 328 may include information about a particular user, location and instances of previous accidents, locations and instances of previous claims, information about other users with similar characteristics, etc.

In step 515, the system may provide a prioritized ranking of restaurants based on the telematics information and the mobile food order request. For example, if the mobile food order request includes a drive-thru and fast food request, the system will provide a prioritized ranking of drive-thru and fast food restaurants closest to the user and based on the user's direction of travel and or route/destination. Additionally, based on the telematics data and the mobile food order request, the system may know where the user is and the direction of travel of the user and therefore provide the safest route or the safest or healthiest restaurant and/or a prioritized list of those restaurants.

In addition to step 515, the system may provide additional ranking of restaurants based on insurance information 328. The system may use the insurance information 328 of previous accident locations and claims to assist in selecting the route or the restaurant. The system may provide recommendations for the safest routes and rate the routes and the potential restaurants based on the previous accidents and claims in the insurance information 328.

The system may also use the insurance information 328 of the particular user and information about users with similar characteristics to provide recommendations regarding routes and restaurant destinations. Based on the user characteristics and past behavior, the system may prioritize a list of potential restaurants or routes for the individual that the system determines will best meet the preferences of the individual.

In step 520, the system may provide restaurant information regarding any of the restaurants on the prioritized restaurant ranking list. This restaurant information may include, but not be limited to location, restaurant type, and food type. Additionally, the restaurant information may include real-time information about a given restaurant, such as order wait time, delivery time, seating time, etc. The system may also provide restaurant information based on a specific search request within the mobile food order application. The user may search for a specific restaurant within the mobile food order application with the return of the restaurant information for the searched restaurant or restaurants.

In step 525, the system may also provide menu information regarding any of the restaurants on the prioritized restaurant ranking list. The system may also provide menu information also based on a specific search request within the mobile food order application 300. The user may search for a specific restaurant within the mobile food order application 300 with the return of the menu information for the searched restaurant or restaurants. A user may then place an order from the menu information and restaurant information provided in steps 520 and 525.

In step 530, the system may then receive a mobile food order from the user. The user may input the mobile food order via the menu and/or the restaurant information on the mobile device 215 and the mobile food order application 300 provided in steps 520 and 525. The user may input the mobile food order with a simple one or two-button sequence. Additionally, the user may input the mobile food order using the hands-free service within their vehicle that is wirelessly connected to the mobile device 215 and/or the mobile food order application 300.

In step 535, the system may transmit the mobile food order to the selected restaurant. The selected restaurant may have a restaurant server 330 or processor that communicates with the mobile food order application 300 and the mobile food order system 220. The selected restaurant may require the necessary hardware and/or software to communicate with the mobile food order application and the mobile food order system 220.

Coincident to step 535, in step 540, the system may also provide an electronic payment for the food to the restaurant server 330. The electronic payment may be made automatically to the restaurant server 330 and facilitated by the user entering their payment information into the mobile food order application 300 during a set-up portion of the application. The electronic payment may also be made to the restaurant server 330 manually for an individual order by entering the payment information when the order is placed.

In step 545, the system may receive a confirmation of the order from the restaurant server 330. The confirmation of the order may be received via one or more of the following methods: email, text, phone call, social media, etc.

In step 550, the system may provide rewards to the user depending on the restaurant chosen by the user and/or the food ordered by the user. The system may also provide rewards based on the user's decision to follow the recommendations of the system. The rewards may include cash back, a reward at the restaurant, a discount at the restaurant, and/or a bonus food item.

In addition to step 550, in step 553, the system may provide insurance rewards to the user depending on the restaurant chosen by the user and/or the food ordered by the user. The system may also provide insurance rewards based on the user's decision to follow the recommendations of the system. The insurance rewards may include discounts on future premiums, increased insurance coverage, and/or decreased deductible.

In step 555, the system may use the ordering information in deriving insurance rating factors for insurance coverage. For example, the system may keep track and analyze which restaurants the user orders from, the locations of those restaurants, when the user orders food, and the type of food ordered, the frequency of orders, etc. Based on the analysis of these orders and this information among millions of users, the system may derive rating factors from the information. For example, people that order from a restaurant near the highway more than twice a week on average may be subject to a particular rating factor (either increase or decrease the premium for insurance coverage). Many other variables and rating factors may be utilized with this order information, without departing from this disclosure.

According to some arrangements, the process described with respect to FIG. 5 may be provided by a mobile food order application 300 executing on a device such as a user's mobile communication device 215 or a user's vehicle computer or navigation system.

In another aspect of the disclosure, the mobile food order system 220 may provide synergies between restaurants, food, and insurance. For example, the system may recommend those restaurants and eating habits or foods that promote a safer individual through recommendations and rewards. The users of those restaurants may then be rewarded when the user orders from those restaurants or orders those kinds of foods.

Figure 6:
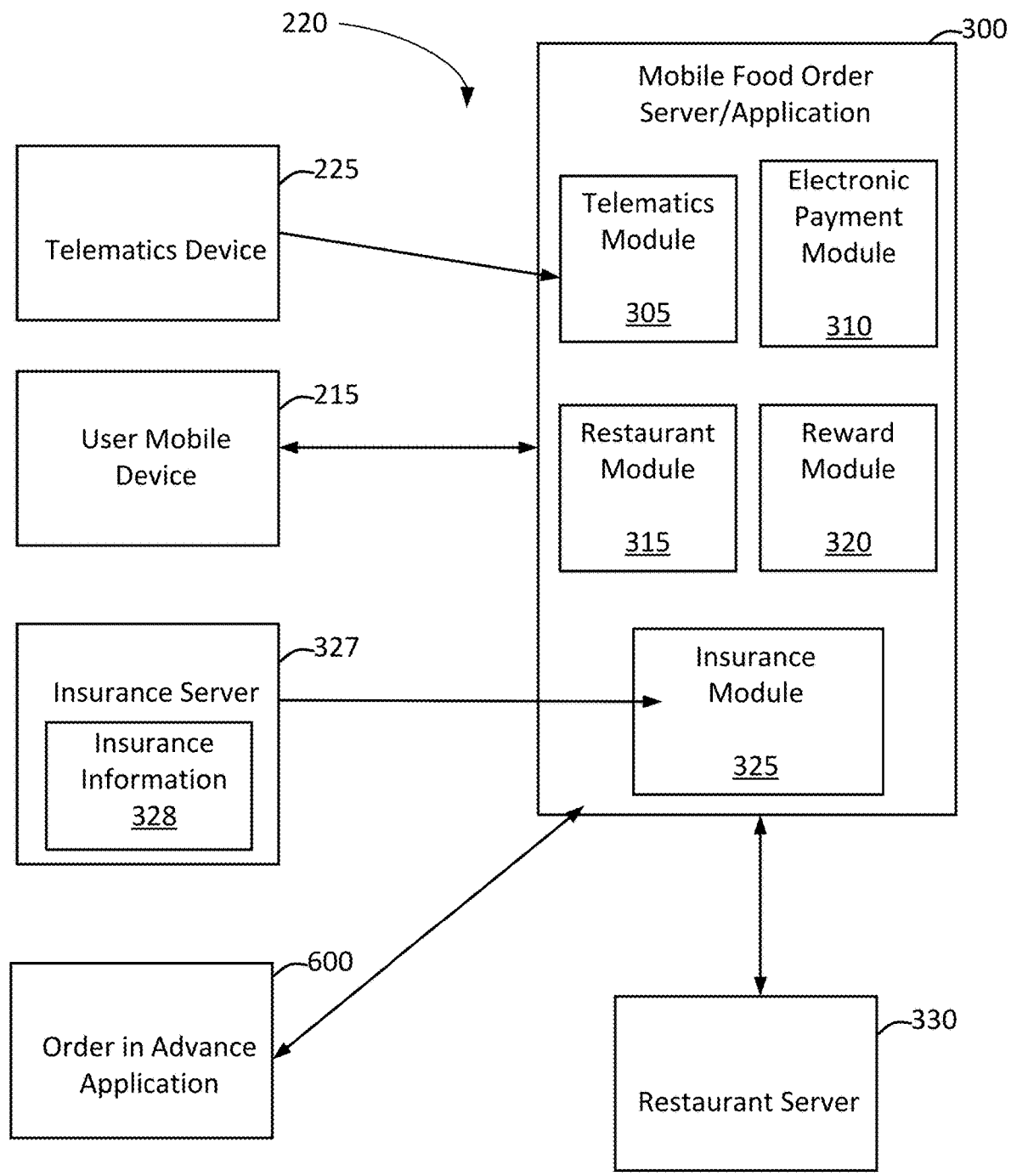
FIG. 6 is an exemplary block diagram of a mobile food order system and application that may be used to implement various aspects of the disclosure.

In another aspect of the disclosure, the mobile food order system 220 may include a mobile food order application 300 with an order in advance application 600. FIG. 6 is an example block diagram of a mobile food order system 220 and mobile food order application 300 that includes the order in advance application 600. The mobile food order application 300 may include a variety of software or firmware modules such as one or more of the following: a telematics module 305, an electronic payment module 310, a restaurant module 315, a reward module 320, and an insurance module 325. Additionally, the order in advance application 600 may be included with the mobile food order application 300 or may be a separate stand-alone application 600 that integrates with the mobile food order application 300. Each of these modules and applications may be utilized by the mobile food order application 300. These modules have been described in detail above with relation to FIG. 3 and are similar in operation to those for this embodiment of the invention.

The mobile food order application 300 with an order in advance application 600 may be similar to the mobile food order application as described and detailed with FIGS. 4 and 5. The order in advance application 600 may be located on a user's mobile device 215, such a cell phone, a smart phone, or tablet/laptop computer. The order in advance application 600 may also be located on a vehicle's on-board computer or navigation system. The mobile food order application 300 and/or order in advance application 600 may be configured to allow for ordering food remotely or from a vehicle for pick-up or delivery by providing the use of an application on a mobile device 215 that provides information that allows the ordering. The mobile food order application 300 may also allow for the electronic payment for the food. Telematics information regarding the user and/or the vehicle may be utilized to provide information regarding a user's location, velocity (instantaneous and average), route, and destination.

Generally, the order in advance application 600 may request from the user whether or not the user wants to order in advance at a selected restaurant. The order in advance application 600 may also request from the user whether or not the user wants to order in advance from a restaurant the user is located. The order in advance application 600 may track the user's previous orders. The order in advance application 600 may record, store, and know that the user frequently goes to the same place every day or frequently during a given time period (i.e. weekly, monthly, or once a year). The order in advance application 600 may also record, store, and know that the user places the same or similar order at the restaurant, such as a certain flavor of coffee or a certain sandwich, etc. The order in advance application 600 may include or utilize one or more of the following steps or components: 1) telematics information may be used to sense location and restaurants that a user has utilized or frequented in the past and provides an option to the user for providing an order in advance of previous orders placed by the user. 2) GPS locations (from the mobile device 215) may be used to sense location and restaurant that a user is located at and has frequented in the past and provides an option to the user for providing an order in advance of one or more of the previous orders placed by the user. The order in advance application 600 may be utilized with the system and methods as described in FIGS. 4 and/or 5.

For example, in step 405, the system may receive a mobile food order request from a user. In this step 405, the user may utilize the mobile food order application 300 on a mobile device 215, such as a cell phone, a smart phone, or a tablet/laptop computer to request a mobile food order. The user may also utilize the mobile food order application 300 on a vehicle's on-board computer or navigation system. In an embodiment according to the disclosure, the system may receive the mobile food order request via a hand-free set up that may be linked or communicatively connected to the mobile device 215 or the vehicle's on-board computer or navigation system. The mobile food order request may include such requests such as the type of restaurant, i.e. fast food or sit-down. The mobile food order request may also include the type of food requested. The mobile food order request may also include whether the order is for drive-thru, pick-up, delivery, fast food or eat-in. The mobile food order request may also include a request whether the user wants to order in advance through the order in advance application 600.

In step 410, the system may receive telematics information or GPS location information. The telematics information or GPS location information may be sent from a telematics device 225 located in the vehicle or as part of the mobile device 215. The telematics information or the GPS location information may include information regarding the user and/or the user's vehicle. The telematics information or the GPS location information may include information such as the user's location, the user's velocity (both instantaneous and/or average), the user's direction of travel, the user's route and final destination. This telematics information or the GPS location information may then be utilized to assist in providing further information to the system and the mobile food order application 300.

In step 415, the system may provide a prioritized ranking of restaurants based on the telematics information or the GPS location information and the mobile food order request. For example, if the mobile food order request includes a drive-thru and fast food request, the system will provide a prioritized ranking of drive-thru and fast food restaurants closest to the user and based on the user's direction of travel and or route/destination. Additionally, based on the telematics data or the GPS location information and the mobile food order request, the system may know where the user is and the direction of travel of the user and therefore provide the safest route or the safest or healthiest restaurant and/or a prioritized list of those restaurants. Additionally, based on the telematics data or the GPS location information and the mobile food order request, the system may provide a list of the highest ranked or highest rated restaurants for the prioritized list of restaurants. In another example, if the mobile food order request includes the order in advance application 600, the system will provide a list of restaurants that the user has attended or frequented in the past.

In step 420, the system may provide restaurant information regarding any of the restaurants on the prioritized restaurant ranking list. This restaurant information may include, but not be limited to location, restaurant type, food type, restaurant ratings, restaurant reviews, etc. Additionally, the restaurant information may include real-time information about a given restaurant, such as order wait time, delivery time, seating time, etc. The system may also provide restaurant information based on a specific search request within the mobile food order application. The user may search for a specific restaurant within the mobile food order application with the return of the restaurant information for the searched restaurant or restaurants. If the order in advance application 600 is utilized, the system may provide restaurant information that includes one or more previous orders from the user at the selected restaurant.

In step 425, the system may also provide menu information regarding any of the restaurants on the prioritized restaurant ranking list. The system may also provide menu information also based on a specific search request within the mobile food order application 300. The user may search for a specific restaurant within the mobile food order application 300 with the return of the menu information for the searched restaurant or restaurants. A user may then place an order from the menu information and restaurant information provided in steps 420 and 425. If the order in advance application 600 is utilized, the system may provide menu information based on one or more of the previous orders from the user at any of the restaurants on the prioritized restaurant ranking list.

In step 430, the system may then receive a mobile food order from the user. The user may input the mobile food order via the menu and/or the restaurant information on the mobile device 215 and the mobile food order application 300 provided in steps 420 and 425. The user may input the mobile food order with a simple one or two-button sequence. The user may also input the mobile food order via the hands-free connection through the mobile device 215 and the mobile food order application 300. If the order in advance application 600 is utilized, the user may input the mobile food order through the order in advance application 600. The user may select the mobile food order through the order in advance application 600.

In step 435, the system may transmit the mobile food order to the selected restaurant. The selected restaurant may have a restaurant server 330 or processor that communicates with the mobile food order application 300 and the mobile food order system 220. The selected restaurant may require the necessary hardware and/or software to communicate with the mobile food order application 300 and the mobile food order system 220.

Coincident to step 435, in step 440, the system may also provide an electronic payment for the food to the restaurant server 330. The electronic payment may be made automatically to the restaurant server 330 and facilitated by the user entering their payment information into the mobile food order application 300 during a set-up portion of the application. The electronic payment may also be made to the restaurant server 330 manually for an individual order by entering the payment information when the order is placed.

In step 445, the system may receive a confirmation of the order from the restaurant server 330. The confirmation of the order may be received via one or more of the following methods: email, text, phone call, social media, etc.

In another embodiment, the order in advance application 600 may be utilized by a user who is personally located at a specific restaurant similar to any of the order in advance applications 600 as described above in a mobile environment. The order in advance application 600 does not need to be utilized only in a mobile environment. The order in advance application 600 may be utilized by a user at the counter or drive-thru of a restaurant. The order in advance application 600 may provide the restaurant with previous orders of the user at that restaurant. The order in advance application 600 may allow the user to select from one or more of the previous orders of the user at that restaurant.

The processes, systems and other features described herein may be applied to all types of restaurants and food products. For example, similar features and systems may be used to provide applications corresponding to different restaurants, different restaurant types, and different food delivery services.

While the invention has been described with respect to specific examples and includes presently preferred modes of carrying out the invention, those skilled in the art will appreciate that there are numerous variations and permutations of the above described systems and techniques that fall within the spirit and scope of this disclosure.

We claim:

1. A mobile food order system comprising:
a mobile food order server having at least one processor;
a mobile food order application for use on a mobile device and executing on the mobile food order server;
a telematics device connected to the mobile device, the telematics device including a processor with a graphical interface, wherein the telematics device collects real-time telematics information based on driving data and transfers the real-time telematics information to the mobile food order application and the mobile food order server; and
a restaurant server connected to and in communication with the mobile food order application and the mobile food order server, wherein the restaurant server provides real-time restaurant information and menu information to the mobile food order application, wherein the real-time restaurant information from the restaurant server includes real-time information that includes one or more of the following: an order wait time for a restaurant, a delivery time for the restaurant, or a seating time for the restaurant;
wherein when the mobile food order application executes on the mobile food order server, causes the at least one processor to:
  receive, through the mobile food order application executing on the mobile food order server, a mobile food order request from a user, wherein the mobile food order request is received through the mobile device via a hands-free system;
  acquire and collect, by the telematics device connected to the mobile food order server and the mobile device, the real-time telematics information;
  receive, by the mobile food order application, the real-time telematics information from the telematics device;
  determine and provide, by the mobile food order application, a prioritized ranking of restaurants based on the real-time telematics information and the mobile food order request;
  provide, by the mobile food order application from the restaurant server, the real-time restaurant information and menu information based on the prioritized ranking of restaurants;
  receive, by the mobile food order application, a mobile food order from the user;
  transmit, by the mobile food order application, the mobile food order to a selected restaurant;
  provide, by the mobile food order application to the restaurant server, an electronic payment for the mobile food order;
  send, by the mobile food order application, the real-time telematics information from the telematics device and the real-time restaurant information from the restaurant server to the mobile device;

receive and display, by the mobile device, the real-time telematics information from the telematics device and the real-time restaurant information from the restaurant server;
generate, by the mobile food order application, a real-time notification when the real-time restaurant information from the restaurant server changes; and
send, over the Internet to the user, the real-time notification to cause the mobile food order application to display an alert on the mobile device to the user.

2. The system of claim 1, wherein when the mobile food order application executes on the mobile food order server, causes the at least one processor to: provide, by the mobile food order application, a reward to the user based on the mobile food order.

3. The system of claim 2, wherein the reward is one or more of the following: cash back, a discount for the mobile food order, or a bonus food item for the mobile food order.

4. The system of claim 2, wherein the reward is one or more of the following: a discount of future insurance premiums for the user, increased coverage for the user, or a decreased deductible for insurance coverage for the user.

5. The system of claim 1, wherein the real-time telematics information includes location, velocity, route, and destination.

6. The system of claim 1, wherein the real-time restaurant information from the restaurant server includes a location of the restaurant, a type of the restaurant, a set of ratings of the restaurant.

7. A mobile food order system comprising:
a mobile food order server having at least one processor;
a mobile food order application for use on a mobile device having at least one processor and executing on the mobile food order server;
a telematics device connected to the mobile device, the telematics device including a processor with a graphical interface, wherein the telematics device collects real-time telematics information based on driving data and transfers the real-time telematics information to the mobile food order application and the mobile food order server; and
a restaurant server connected to and in communication with the mobile food order application and the mobile food order server, wherein the restaurant server provides real-time restaurant information and menu information to the mobile food order application, wherein the real-time restaurant information from the restaurant server includes real-time information that includes one or more of the following: an order wait time for a restaurant, a delivery time for the restaurant, or a seating time for the restaurant;
wherein when the mobile food order application executes on the mobile food order server, causes the at least one processor to:
receive, by the mobile food order system with the mobile food order application executing on the mobile food order server, a mobile food order request from a user;
acquire and collect, by the telematics device connected to the mobile food order server and the mobile device, the real-time telematics information;
receive, by the mobile food order system, the real-time telematics information from the telematics device;
determine and provide, by the mobile food order system, a prioritized ranking of restaurants based on the real-time telematics information and the mobile food order request, wherein the ranking is based on a safest route to the restaurant as determined by the mobile food order system;
provide, by the mobile food order system from the restaurant server, the real-time restaurant information and menu information based on the prioritized ranking of restaurants;
receive, by the mobile food order system, a mobile food order from the user;
transmit, by the mobile food order system, the mobile food order to a selected restaurant;
provide, by the mobile food order system to the restaurant server, an electronic payment for the mobile food order;
send, by the mobile food order application, the real-time telematics information from the telematics device and the real-time restaurant information from the restaurant server to the mobile device;
receive and display, by the mobile device, the real-time telematics information from the telematics device and the real-time restaurant information from the restaurant server;
generate, by the mobile food order application, a real-time notification when the real-time restaurant information from the restaurant server changes; and
send, over the Internet to the user, the real-time notification to cause the mobile food order application to display an alert to the user.

8. The system of claim 7, further including:
receive, by the mobile food order system, insurance information from an insurance server located an insurance company, wherein the insurance information includes information about a particular user, location and instances of previous accidents, and locations and instances of previous claims, wherein the insurance server is connected to the mobile food order application and the insurance server communicates with the mobile food order application and transfers the insurance information.

9. The system of claim 8, wherein the prioritized ranking of restaurants is further based on the insurance information to select a route to the restaurant that is a safest route based on the previous accidents and previous claims in the insurance information.

10. The system of claim 7, wherein the mobile food order request is received through the mobile device via a hands-free system.

11. The system of claim 7, wherein the real-time telematics information includes location, velocity, route, and destination.

12. The system of claim 7, wherein the real-time restaurant information includes a location of the restaurant, a type of the restaurant, a set of ratings of the restaurant.

13. One or more non-transitory computer readable media storing computer readable instructions that, when executed, cause a mobile food order system to:
(a) receive, through a mobile food order application for use on a mobile device and executing on a mobile food order server having at least one processor, a mobile food order request from a user, wherein the mobile food order request is received through the mobile food order system via a hands-free system;
(b) acquire and collect, by a telematics device connected to the mobile food order server and the mobile food order system, real-time telematics information, the telematics device including a processor with a graphical interface, wherein the telematics device collects the real-time telematics information based on driving data and transfers the real-time telematics information to the mobile food order application and the mobile food order server;

(c) receive, by the mobile food order application, the real-time telematics information from the telematics device;

(d) receiving, by the mobile food order application, insurance information from an insurance server located an insurance company, wherein the insurance information includes information about a particular user, location and instances of previous accidents, and locations and instances of previous claims, wherein the insurance server is connected to the mobile food order application and the mobile food order server, and further wherein the insurance server communicates with the mobile food order application and the mobile food order server and transfers the insurance information;

(e) determine and provide, by the mobile food order application, a prioritized ranking of restaurants based on the real-time telematics information, the insurance information, and the mobile food order request, wherein the ranking is based on a safest route to a restaurant;

(f) provide, by the mobile food order application from a restaurant server, real-time restaurant information and menu information based on the prioritized ranking of restaurants, wherein the restaurant server is connected to and in communication with the mobile food order application and the mobile food order server, wherein the real-time restaurant information from the restaurant server includes real-time information that includes one or more of the following: an order wait time for the restaurant, a delivery time for the restaurant, or a seating time for the restaurant;

(g) receive, by the mobile food order application, a mobile food order from the user;

(h) transmit, by the mobile food order application, the mobile food order to a selected restaurant;

(i) provide, by the mobile food order application to the restaurant server, an electronic payment to the selected restaurant for the mobile food order;

(j) provide, by the mobile food order application, a reward to the user based on the mobile food order and the selected restaurant;

(k) sending, by the mobile food order application, the real-time telematics information from the telematics device and the real-time restaurant information from the restaurant server to the mobile device;

(l) receiving and displaying, by the mobile device, the real-time telematics information from the telematics device and the real-time restaurant information from the restaurant server;

(m) generating, by the mobile food order application, a real-time notification when the real-time restaurant information from the restaurant server changes; and (n) sending, over the Internet to the user, the real-time notification to cause the mobile food order application to display an alert to the user.

14. The one or more non-transitory computer readable media of claim 13, wherein the prioritized ranking of restaurants is based on the insurance information to select a route to the restaurant that is a safest route based on the previous accidents and previous claims in the insurance information.

15. The one or more non-transitory computer readable media of claim 13, wherein the insurance information includes information about the user and information about customers with similar characteristics to provide the prioritized ranking of restaurants.

16. The one or more non-transitory computer readable media of claim 13, wherein the restaurant information includes a location of the restaurant, a type of the restaurant, a set of ratings of the restaurant.

17. The one or more non-transitory computer readable media of claim 13, wherein the reward is one or more of the following: cash back, a discount for the mobile food order, or a bonus food item for the mobile food order.

18. The one or more non-transitory computer readable media of claim 13, wherein the reward is one or more of the following: a discount of future insurance premiums for the user, increased coverage for the user, or a decreased deductible for insurance coverage for the user.

* * * * *

UNITED STATES PATENT AND TRADEMARK OFFICE
CERTIFICATE OF CORRECTION

| | |
|---|---|
| PATENT NO. | : 10,586,294 B1 |
| APPLICATION NO. | : 16/191265 |
| DATED | : March 10, 2020 |
| INVENTOR(S) | : Wilson et al. |

It is certified that error appears in the above-identified patent and that said Letters Patent is hereby corrected as shown below:

In the Specification

Column 10, Detailed Description, Line 17:
Delete "309" and insert --325--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*